(12) United States Patent
Kaneko et al.

(10) Patent No.: US 12,546,730 B2
(45) Date of Patent: Feb. 10, 2026

(54) METHOD FOR ESTIMATING ABRASION RESISTANCE

(71) Applicant: SUMITOMO RUBBER INDUSTRIES, LTD., Kobe (JP)

(72) Inventors: Fusae Kaneko, Kobe (JP); Hiroyuki Kishimoto, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 429 days.

(21) Appl. No.: 18/114,370

(22) Filed: Feb. 27, 2023

(65) Prior Publication Data

US 2023/0324315 A1    Oct. 12, 2023

(30) Foreign Application Priority Data

Mar. 24, 2022   (JP) ................................. 2022-048370

(51) Int. Cl.
  *G01N 23/085*   (2018.01)
  *G01N 33/44*   (2006.01)
  *G01N 33/00*   (2006.01)

(52) U.S. Cl.
  CPC ......... *G01N 23/085* (2018.02); *G01N 33/445* (2013.01); *G01N 33/0003* (2024.05); *G01N 2223/04* (2013.01); *G01N 2223/634* (2013.01)

(58) Field of Classification Search
  CPC ... G01N 33/445; G01N 23/085; G01N 23/083
  See application file for complete search history.

(56) References Cited

U.S. PATENT DOCUMENTS

2019/0285609 A1*   9/2019   Kaneko ................ G01N 33/445

FOREIGN PATENT DOCUMENTS

| JP | 2014-115102 A | 6/2014 |
| JP | 2017-201252 A | 11/2017 |
| JP | 2018-178018 A | 11/2018 |
| JP | 2020-27084 A  | 2/2020 |

* cited by examiner

*Primary Examiner* — Lam S Nguyen
(74) *Attorney, Agent, or Firm* — Birch, Stewart, Kolasch & Birch, LLP

(57) ABSTRACT

Provided is a method for estimating abrasion resistance of polymer composite materials. The present disclosure relates to a method for estimating abrasion resistance, the method including: irradiating a sulfur compound-containing polymer composite material with high intensity X-rays; measuring an X-ray absorption in a small region of the polymer composite material while varying an energy of the X-rays, whereby a dispersion state and a chemical state of the sulfur compound are analyzed; and quantifying an inhomogeneous state of cross-link degradation in the polymer composite material based on the dispersion state and the chemical state.

5 Claims, 2 Drawing Sheets

X-ray absorption
High ▬▬ Low

X-ray absorption
High ▬▬ Low

METHOD FOR ESTIMATING ABRASION RESISTANCE

TECHNICAL FIELD

The present disclosure relates to methods for estimating abrasion resistance.

BACKGROUND ART

In rubber materials, polymer molecules are bridged by sulfur to form cross-linked structures which provide peculiar physical properties such as strength, mechanical fatigue resistance, energy loss due to repeated deformation, and frequency response properties. Such rubber materials are essential for applications such as tires and damping materials. One of the points for improving the strength and mechanical fatigue resistance of rubbers is to control the cross-linked structures. For example, when cross-linked portions are degraded by heat or the like, sulfur bridges between polymer molecules break and re-cross-linking occurs to harden the rubbers, which tend to cause deterioration of the properties of the rubbers.

Various analysis methods have been suggested. For example, Patent Literatures 1 to 4 disclose a method for analyzing degradation of cross-links in polymer composite materials, a method for visualizing cross-linked structures in polymer composite materials, a method for visualizing a dispersion/chemical state of each vulcanization material, and a method for measuring the hardness of cross-linked materials in polymer composite materials. Still, more precise deterioration analysis methods have been desired.

CITATION LIST

Patent Literature

Patent Literature 1: JP 2014-115102 A
Patent Literature 2: JP 2020-027084 A
Patent Literature 3: JP 2017-201252 A
Patent Literature 4: JP 2018-178016 A

SUMMARY OF INVENTION

Technical Problem

The present disclosure aims to solve the above problem and provide a method for estimating abrasion resistance of polymer composite materials.

Solution to Problem

The present disclosure relates to a method for estimating abrasion resistance, the method including: irradiating a sulfur compound-containing polymer composite material with high intensity X-rays; measuring an X-ray absorption in a small region of the polymer composite material while varying an energy of the X-rays, whereby a dispersion state and a chemical state of the sulfur compound are analyzed; and quantifying an inhomogeneous state of cross-link degradation in the polymer composite material based on the dispersion state and the chemical state.

Advantageous Effect of the Invention

The present disclosure relates to a method for estimating abrasion resistance, the method including: irradiating a sulfur compound-containing polymer composite material with high intensity X-rays; measuring an X-ray absorption in a small region of the polymer composite material while varying an energy of the X-rays, whereby a dispersion state and a chemical state of the sulfur compound are analyzed; and quantifying an inhomogeneous state of cross-link degradation in the polymer composite material based on the dispersion state and the chemical state. This method can precisely estimate the abrasion resistance of polymer composite materials. Thus, the method can provide a polymer composite material having excellent abrasion resistance.

DESCRIPTION OF EMBODIMENTS

Figure 1:
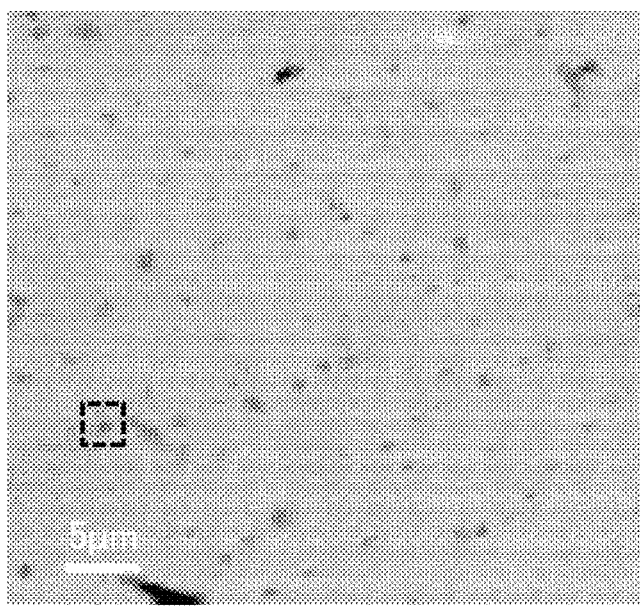
FIG. 1 is an example of a mapping image of a sulfur L shell absorption edge and the vicinity thereof of a polymer composite material as a degraded sample.

The present disclosure relates to a method for estimating abrasion resistance, the method including: irradiating a sulfur compound-containing polymer composite material with high intensity X-rays; measuring an X-ray absorption in a small region of the polymer composite material while varying an energy of the X-rays, whereby a dispersion state and a chemical state of the sulfur compound are analyzed; and quantifying an inhomogeneous state of cross-link degradation in the polymer composite material based on the dispersion state and the chemical state.

According to the method of the present disclosure, first, the X-ray absorption in a small region of a sulfur compound-containing polymer composite material is measured using a scanning transmission X-ray microscope (STXM) or the like, and the dispersion of the sulfur compound (e.g., sulfur aggregate structures) is visualized and the chemical state of the sulfur compound is analyzed to calculate the amounts of sulfur oxides (SOx) and the like. The presence of Sox and the like demonstrates cross-link degradation. Then, the inhomogeneous state of SOx and the like in the polymer composite material is quantified and represented by a numerical value. The numerical value has been found to have a relationship with abrasion resistance. Thus, the abrasion resistance can be estimated based on the numerical value.

Accordingly, by subjecting sulfur compound-containing polymer composite materials as specimens to the method of the present disclosure, the abrasion resistance of products such as tires can be estimated without actually producing the products and testing them for durability.

The sulfur compound-containing polymer composite material used in the method of the present disclosure contains "sulfur compounds" (sulfur-containing compounds), and the present disclosure includes to a method for analyzing the dispersion state and the chemical state of the "sulfur compounds" in the polymer composite material. The polymer composite material usually used in the present disclosure is a polymer composite material in which the cross-links have been degraded (cross-linked portions have been degraded).

Examples of the sulfur compounds (sulfur-containing compounds) include sulfur-containing compounds generated by cross-link degradation, vulcanizing agents, and sulfur-containing compounds involved in vulcanization. Of these, in order to suitably analyze the state of cross-link degradation, sulfur-containing compounds generated by cross-link degradation are desired.

Examples of the sulfur-containing compounds generated by cross-link degradation include (1) compounds generated by binding of oxygen to sulfur derived from S—S bonds broken by cross-link degradation, such as sulfur oxides (SOx), and (2) various compounds generated by re-binding of sulfur derived from S—S bonds broken by cross-link degradation to polymer molecules. The compounds (1) can be analyzed using the X-ray absorption spectra (XAFS) of a sulfur L-shell absorption edge and a sulfur K-shell absorption edge, for example, as described later. The compounds (2) can be analyzed based on the assignment of the peaks to S—C, peak heights, or peak areas using the X-ray absorption spectrum (XAFS) of a sulfur K shell absorption edge, for example.

Examples of the vulcanizing agents include those generally used in the tire industry, such as sulfur vulcanizing agents (vulcanizing agents consisting of sulfur such as powdered sulfur); and sulfur-containing vulcanizing agents such as sodium 1,6-hexamethylene-dithiosulfate dihydrate and 1,6-bis(N,N'-dibenzylthiocarbamoyldithio) hexane.

Examples of the sulfur-containing compounds involved in vulcanization include vulcanization accelerators and additives equivalent to vulcanization accelerators. Common vulcanization accelerators are compounds which have a vulcanization accelerating effect and are added (incorporated) and kneaded in a kneading step for rubber compositions.

Examples of the vulcanization accelerators include various vulcanization accelerators known in the tire industry, such as guanidine vulcanization accelerators, sulfenamide vulcanization accelerators, thiazole vulcanization accelerators, thiuram vulcanization accelerators, dithiocarbamate vulcanization accelerators, thiourea vulcanization accelerators, and xanthate vulcanization accelerators.

Examples of the additives equivalent to vulcanization accelerators include 4,4'-dithiodimorpholine, 2-(4'-morpholinodithio) benzothiazole, and tetramethylthiuramdisulfide.

Examples of the polymer composite material include materials containing one or more diene-based polymers and composite materials in which one or more rubber materials are combined with one or more resins.

Examples of the diene-based polymers include polymers having double bonds, such as natural rubbers (NR), polyisoprene rubbers (IR), polybutadiene rubbers (BR), styrene butadiene rubbers (SBR), acrylonitrile butadiene rubbers (NBR), chloroprene rubbers (CR), butyl rubbers (IIR), halogenated butyl rubbers (X-IIR), and styrene isoprene butadiene rubbers (SIBR).

Non-limiting examples of the resins include resins generally used in the rubber industry, such as C5 aliphatic petroleum resins, cyclopentadiene petroleum resins, and other petroleum resins.

In the present disclosure, the X-ray absorption may be measured by, for example, micro X-ray absorption fine structure (XAFS) analysis, which is a technique for measuring the X-ray absorption spectrum of a small region of a specimen using high-intensity X-rays. Standard XAFS analysis does not have spatial resolution and detects the absorption in the entire specimen. On the other hand, micro XAFS analysis is a method for measuring the X-ray absorption spectrum of a small region of a specimen, and usually has a spatial resolution of about 100 nm or less. Thus, use of micro XAFS analysis enables detection of the difference in absorption among components in the specimen, such as sulfur-containing compounds generated by cross-link degradation, vulcanizing agents, and sulfur-containing compounds involved in vulcanization.

From the viewpoint of excellent spatial resolution, the micro XAFS analysis is preferably a method of measuring at a soft X-ray region (micro NEXAFS), and examples include scanning transmission X-ray microscopy (STXM) and X-ray photo emission electron microscopy (XPEEM).

Since sulfur, vulcanization accelerators, and the like in the polymer are easily damaged by X-rays, a method less likely to cause X-ray damage is desired for measurement in the present disclosure. From this point of view, preferred is STXM, which is less likely to cause X-ray damage. More preferably, the specimen is cooled during the measurement to prevent X-ray damage.

The STXM can measure the X-ray absorption in a small region of a specimen by irradiating the small region with high intensity X-rays focused by a Fresnel zone plate and measuring the light passing through the specimen (transmitted light) and the incident light. The high-intensity X-rays may be focused by a Kirkpatrick-Baez (K-B) focusing system using an X-ray reflecting mirror instead of a Fresnel zone plate.

Scanning with X-ray energy requires a continuous X-ray generator as a light source. Detailed analysis of the chemical state requires measurement of an X-ray absorption spectrum with high S/N and S/B ratios. Thus, most suitable for the measurement is a synchrotron which is a continuous X-ray source and emits X-rays having a brilliance of at least $10^{10}$ (photons/s/mrad$^2$/mm$^2$/0.1% bw). Here, the "bw" represents the band width of X-rays emitted from the synchrotrons.

The brilliance (photons/s/mrad$^2$/mm$^2$/0.1% bw) of the high intensity X-rays is preferably $10^{10}$ or higher, more preferably $10^{11}$ or higher, still more preferably $10^{12}$ or higher. The upper limit thereof is not limited, and the X-ray intensity used is preferably low enough not to cause radiation damage.

The number of photons (photons/s) of the high intensity X-rays is preferably $10^7$ or larger, more preferably $10^9$ or larger. The upper limit thereof is not limited, and the X-ray intensity used is preferably low enough not to cause radiation damage.

Scanning with high-intensity X-rays is preferably performed in an energy range of 4000 eV or less, more preferably 1500 eV or less, still more preferably 1000 eV or less. In a range exceeding 4000 eV, a target polymer composite material may not be analyzed. The lower limit of the energy range is not limited.

In particular, preferably, the sulfur X-ray absorption at a sulfur L-shell absorption edge is measured by scanning the energy range of 130 to 280 eV, and the sulfur X-ray absorption at a sulfur K-shell absorption edge is measured by scanning the energy range of 2300 to 3200 eV.

The energy range for the sulfur L-shell absorption edge is more preferably 140 to 200 eV, still more preferably 150 to 180 eV. The energy range for the sulfur K-shell absorption edge is more preferably 2300 to 3000 eV, still more preferably 2400 to 2600 eV.

In the present disclosure, the dispersion state and the chemical state of the "sulfur compound" (preferably a sulfur-containing compound generated by cross-link degradation) contained in the sulfur compound-containing polymer composite material as a sample after cross-link degradation are analyzed, and the inhomogeneous state of the cross-link degradation in the material is quantified based on the results.

For example, the inhomogeneous state of cross-link degradation can be quantified by analyzing the dispersion state and the chemical state of the sulfur compound by the following technique.

First, a polymer composite material, as a sample after cross-link degradation, containing a sulfur aggregate structure portion (a portion where components such as sulfur oxides that are considered to be generated by degradation aggregate) and a matrix portion (a portion free from a sulfur aggregate structure) is subjected to measurement of X-ray absorption in a small region containing both portions while varying the energy. Thus, X-ray absorption spectra containing the spectral information of the sulfur aggregate structure portion and the matrix portion are obtained.

The assignment of peaks of sulfur oxides uses the measured spectra of single reagents such as $ZnSO_4$ and dimethylsulfone as reference spectra. When the information of the state of sulfur cross-links, the dispersion state of a vulcanization accelerator, or ZnO is needed, the spectrum of the corresponding reference specimen, i.e., the specimen of sulfur, the vulcanization accelerator, or ZnO, is appropriately measured in advance.

By using the spectrum of the reference specimen and using an analysis method such as singular value decomposition, the location of the corresponding compound in the measured image can be specified.

The degree of inhomogeneity of the cross-linked state after cross-link degradation can be examined by comparing the peak intensity, peak area, or the like among the peaks assigned to components such as sulfur oxides. For example, the higher the peak intensity or the larger the peak area of the sulfur aggregate portion than the peak intensity or the peak area of the matrix portion, the larger the amount of components such as sulfur oxides. This indicates further progress of the cross-link degradation and a high degree of inhomogeneity of the cross-link state.

The method of the present disclosure will be described in more detail below.

Figure 2:
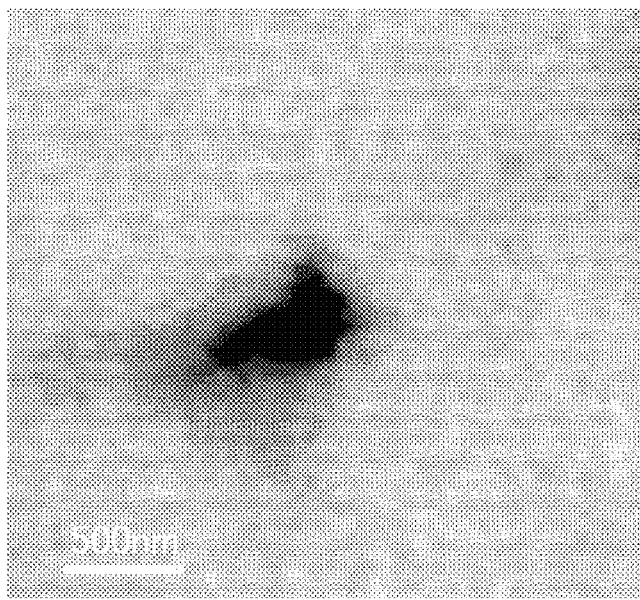
FIG. 2 is an example of an enlarged view of an area enclosed by a dashed line in FIG. 1.

FIG. 1 is a mapping image of a sulfur L shell absorption edge and the vicinity thereof of a sulfur compound-containing polymer composite material as a specimen. FIG. 2 is an enlarged view of the area enclosed by the dashed line in FIG. 1. Black portions indicate sulfur aggregate portions (portions where sulfur aggregates), and gray portions indicate matrix portions (portions where sulfur does not aggregate). In the mapping image, the X-ray absorption is higher in the black portions, which indicates that sulfur is present in the black portions. Thus, a larger amount of sulfur is present in the black portions than in the gray portions.

Figure 3:
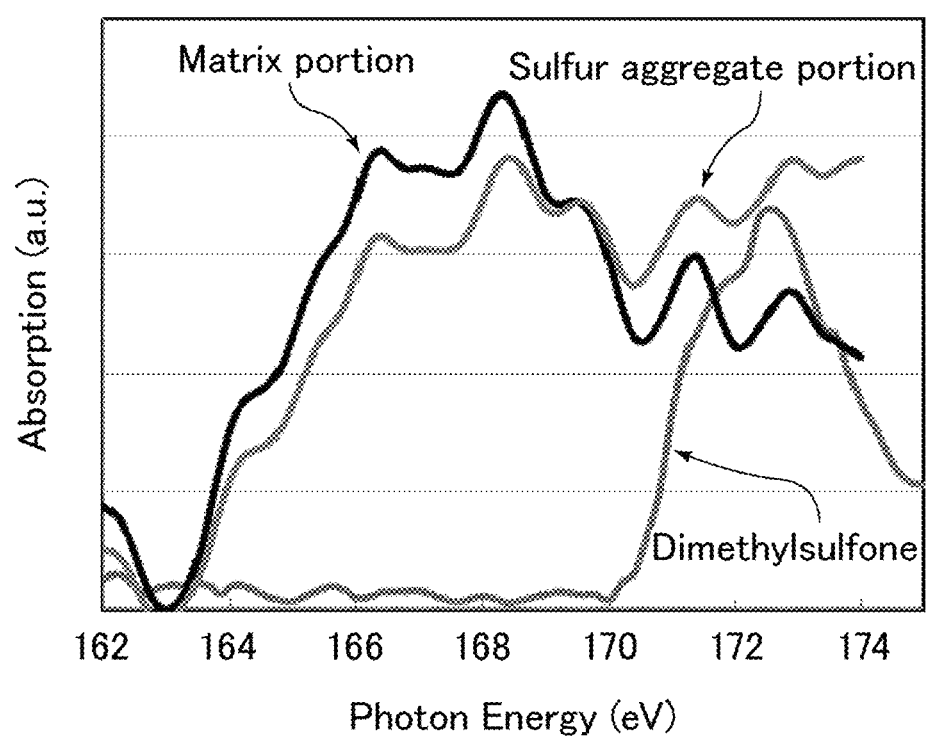
FIG. 3 is a graph showing examples of X-ray absorption spectra of the sulfur L-shell absorption edge and the vicinity thereof of the materials.

FIG. 3 shows the X-ray absorption spectra of the sulfur aggregate portion and the matrix portion obtained by STXM analysis of the field shown in FIG. 2 in the energy range of 162 to 174 eV. FIG. 3 also shows the X-ray absorption spectrum of dimethylsulfone $((CH_3)_2SO_2)$ as a reference spectrum. Sulfur oxides (SOx) generated by cross-link degradation have a peak around 173 eV like dimethylsulfone. The peak intensity or peak area around 173 eV of the sulfur aggregate portion and the peak intensity or peak area around 173 eV of the matrix portion in FIG. 3 are calculated and quantified. Comparison of the calculated values demonstrates that the higher the peak intensity or the larger the peak area of the sulfur aggregate portion than the peak intensity or the peak area of the matrix portion, the more the cross-link degradation in the sulfur aggregate portion proceeds, indicating that the cross-link state after cross-link degradation is inhomogeneous.

The inhomogeneous state of cross-links in the polymer composite material as a sample after cross-link degradation can be suitably evaluated by the degree of inhomogeneity calculated by the following (Relationship 1):

(Degree of inhomogeneity of cross-link degradation)=$SO_A/SO_M$    (Relationship 1)

wherein $SO_A$ represents a sulfur oxide content of a sulfur-aggregated portion in the polymer composite material, and $SO_M$ represents a sulfur oxide content of a matrix portion in the polymer composite material.

Here, $SO_A$ and $SO_M$ may be values obtained by any method capable of measuring the sulfur oxide content of the sulfur aggregate structure portions and the sulfur oxide content of the matrix portions, respectively. In particular, desirably, $SO_A$ and $SO_M$ are the peak intensities or peak areas obtained from the X-ray absorption spectra of the sulfur-aggregated portion and the matrix portion, respectively, shown in FIG. 3. In this case, the value of $SO_A/SO_M$ refers to the ratio of (the peak intensity or peak area assigned to components such as sulfur oxides in the X-ray absorption spectrum of the sulfur-aggregated portion)/(the peak intensity or peak area assigned to components such as sulfur oxides in the X-ray absorption spectrum of the matrix portion).

The closer the value of $SO_A/SO_M$ is to 1.0, the smaller the difference between the cross-linked state of the sulfur-aggregated portion and the cross-linked state of the matrix portion, indicating that the cross-linked state is homogeneous even after deterioration. In this case, the abrasion resistance of the polymer composite material is estimated as excellent.

From the viewpoint that the inhomogeneity of cross-link degradation is low, the value of $SO_A/SO_M$ is desirably equal to or less than a predetermined value. For example, the value of $SO_A/SO_M$ suitably satisfies the following relationship:

$SO_A/SO_M \leq 100.0$.

The upper limit of the value of $SO_A/SO_M$ is preferably 50.0 or less, more preferably 10.0 or less, still more preferably 3.0 or less, particularly preferably 2.0 or less. The closer the value of $SO_A/SO_M$ is to 1.0, the more homogeneous the cross-linked state is, even after degradation.

The lower limit of the value of $SO_A/SO_M$ is theoretically considered to be 1.0 or more, but may be 0.1 or more, 0.3 or more, or 0.7 or more.

The $SO_A$ and $SO_M$ are each desirably calculated by determining the average value thereof in a field of several micrometers in size in the mapping image. In order to precisely calculate the $SO_A$ and $SO_M$, the measurement is performed on a plurality of fields of such a size, and the results are used for calculation.

The values of $SO_A$ and $SO_M$ change depending on a method of spectrum normalization. Thus, desirably, the value of $SO_A/SO_M$ is used for the evaluation.

FIGS. 1 to 3 each show an example of the measurement of the sulfur L-shell absorption edge, but a sulfur K-shell absorption edge is applicable instead thereof.

As described above, the method of the present disclosure is used to analyze the dispersion state and the chemical state of the sulfur compound in a sulfur compound-containing polymer composite material as a sample after cross-link degradation and quantify the inhomogeneous state of cross-link degradation in the polymer composite material based on the dispersion state and the chemical state of the sulfur compound. The value obtained by the quantification correlates with the abrasion resistance of products containing the material, such as tires. Thus, the abrasion resistance of the material can be estimated.

EXAMPLES

The present disclosure will be specifically described with reference to, but not limited to, examples.
<Method for Preparation of Specimen>
A 1.7-L Banbury mixer available from KOBE STEEL, LTD. was filled to 58% of its volume with materials other than sulfur and a vulcanization accelerator in accordance with the following formulation. The materials were kneaded at 80 rpm to 140° C. (step 1).
To the resulting kneaded mixture obtained in the step 1 were added the sulfur and the vulcanization accelerator according to the following formulation, and they were vulcanized at 160° C. for 20 minutes to provide a rubber specimen as a new specimen (step 2).
The rubber specimen as a new specimen was degraded in an oven at 80° C. for one week to obtain a rubber material after degradation as a degraded specimen (step 3).
(Formulation)
The formulation is as follows: 50 parts by mass natural rubber, 50 parts by mass polybutadiene rubber, 60 parts by mass carbon black, 5 parts by mass oil, 2 parts by mass antioxidant, 2.5 parts by mass wax, 3 parts by mass zinc oxide, 2 parts by mass stearic acid, 1.2 parts by mass powdered sulfur, and 1 part by mass vulcanization accelerator.
The materials used are as follows.
Natural rubber: TSR 20
Polybutadiene rubber: BR150B available from Ube Industries, Ltd.
Carbon black: SHOBLACK N351 available from Cabot Japan K.K.
Oil: Process X-140 available from Japan Energy Corporation
Antioxidant: NOCRAC 6C (N-1,3-dimethylbutyl-N'-phenyl-p-phenylenediamine) available from Ouchi Shinko Chemical Industrial Co., Ltd.
Wax: OZOACE 0355 available from Nippon Seiro Co., Ltd.
Zinc oxide: Ginrei R available from Toho Zinc Co., Ltd.
Stearic acid: Tsubaki available from NOF Corporation
Powdered sulfur (containing 5% of oil): 5% oil-treated sulfur powder (soluble sulfur containing 5% by mass of oil) available from Tsurumi Chemical Industry Co., Ltd.
Vulcanization accelerator: Nocceler CZ (N-cyclohexyl-2-benzothiazylsulfenamide) available from Ouchi Shinko Chemical Industrial Co., Ltd.
<Tire Performance Test>
Abrasion Resistance:
A vehicle equipped with each set of test tires was run, and the change in the depth of the pattern grooves from before to after 30000 km running was determined. The change in the degraded specimen was expressed as an index, with the change in the new specimen set to 100. The smaller the index compared to 100, the worse the abrasion resistance.
<Calculation of Degree of Inhomogeneity of Cross-Link Degradation>
(Sampling Method)
Free sulfur was removed from each of the specimens by the technique described in JP 2014-238287 A, all of which are incorporated herein by referece, and the following procedures were performed.
Comparative Example 1: In NEXAFS analysis, a test piece prepared by slicing each specimen with a knife was mounted on a holder.
Comparative Example 2: In TEM-EDX analysis, a test piece prepared by cutting each specimen with a microtome to a thickness of 100 nm was mounted on a Cu grid for TEM.
Example: In STXM analysis, a test piece prepared by cutting each specimen with a microtome to a thickness of 250 nm was mounted on a Cu grid for TEM.

Comparative Example 1

Each specimen was subjected to NEXAFS analysis under the following conditions.
(Measurement Location)
The Kyushu Synchrotron Light Research Center BL12
(Measurement Energy)
S L-edge: 162 to 174 eV Comparative Example 2

Each specimen was subjected to TEM-EDX analysis using a commercial device.

EXAMPLE

Each specimen was subjected to STXM analysis under the following conditions.
(Measurement Location)
UVSOR Synchrotron Facility, National Institutes of Natural Sciences, Institute for Molecular Science, BL4U
(Measurement Conditions)
Brilliance: $1 \times 10^{16}$ (photons/s/mrad$^2$/mm$^2$/0.1% bw)
Spectrometer: grating spectrometer
(Measurement Energy)
S L-edge: 162 to 174 eV
(Evaluation)
Example (STXM), Comparative Example 1 (NEXAFS), and Comparative Example 2 (TEM-EDX) were evaluated for whether or not the calculation of the average sulfur oxide content of the sulfur-aggregated portion and the average sulfur oxide content of the matrix portion in the specimen was possible. In the example, whether or not the calculation was possible was examined by analysis using aXis2000 (free software) in accordance with the method shown in FIGS. 1 to 3. Table 1 shows the results.

TABLE 1

|  | Example (STXM) | | Comparative Example 1 (NEXAFS) | | Comparative Example 2 (TEM-EDX) | |
| --- | --- | --- | --- | --- | --- | --- |
|  | New specimen | Degraded specimen | New specimen | Degraded specimen | New specimen | Degraded specimen |
| Abrasion resistance (in-vehicle) | 100 | 89 | 100 | 89 | 100 | 89 |

TABLE 1-continued

|  | Example (STXM) | | Comparative Example 1 (NEXAFS) | | Comparative Example 2 (TEM-EDX) | |
| --- | --- | --- | --- | --- | --- | --- |
|  | New specimen | Degraded specimen | New specimen | Degraded specimen | New specimen | Degraded specimen |
| Average sulfur oxide content ($SO_A$) of sulfur-aggregated portion | 0.20 | 0.50 | Unanalyzable | Unanalyzable | Unanalyzable | Unanalyzable |
| Average sulfur oxide content ($SO_M$) of matrix portion | 0.15 | 0.30 | Unanalyzable | Unanalyzable | Unanalyzable | Unanalyzable |
| Degree of inhomogeneity (=$SO_A/SO_M$) of cross-link degradation | 1.3 | 1.7 | Unanalyzable | Unanalyzable | Unanalyzable | Unanalyzable |

In Comparative Example 1, the analysis could not be performed because the NEXAFS analysis is bulk measurement, which cannot measure the matrix portion and the sulfur-aggregated portion separately. In Comparative Example 2, the analysis could not be performed because the TEM-EDX analysis can separate the sulfur-aggregated portion and the matrix portion, but cannot analyze the chemical state.

In contrast, in the STXM analysis in the example, the degree of inhomogeneity of cross-link degradation could be calculated in the following way: the sulfur-aggregated portion and the matrix portion were visualized by measuring the X-ray absorption in a small region, and the average sulfur oxide contents of the portions were calculated. The new specimen with better abrasion resistance is estimated to have a degree of inhomogeneity of cross-link degradation closer to 1.0 and better abrasion resistance compared to the degraded specimen, and this estimate has a correlation with in-vehicle abrasion resistance.

The present disclosure (1) relates to a method for estimating abrasion resistance, the method comprising:
  irradiating a sulfur compound-containing polymer composite material with high intensity X-rays;
  measuring an X-ray absorption in a small region of the polymer composite material while varying an energy of the X-rays, whereby a dispersion state and a chemical state of the sulfur compound are analyzed; and
  quantifying an inhomogeneous state of cross-link degradation in the polymer composite material based on the dispersion state and the chemical state.

The present disclosure (2) relates to the method for estimating abrasion resistance according to the present disclosure (1),
  wherein the quantifying the inhomogeneous state of cross-link degradation is performed by calculating a degree of inhomogeneity of cross-link degradation using the following (Relationship 1):

(Degree of inhomogeneity of cross-link degradation)=$SO_A/SO_M$  (Relationship 1)

wherein $SO_A$ represents a sulfur oxide content of a sulfur-aggregated portion in the polymer composite material, and $SO_M$ represents a sulfur oxide content of a matrix portion in the polymer composite material.

The present disclosure (3) relates to the method for estimating abrasion resistance according to the present disclosure (2),
  wherein the method estimates that the closer a value of $SO_A/SO_M$ is to 1.0, the better the abrasion resistance of the polymer composite material is.

The present disclosure (4) relates to the method for estimating abrasion resistance according to the present disclosure (2) or (3),
  wherein the value of $SO_A/SO_M$ satisfies the relationship $SO_A/SO_M \leq 100.0$.

The present disclosure (5) relates to the method for estimating abrasion resistance according to any one of the present disclosures (1) to (4),
  wherein the method includes measuring at least one of a sulfur X-ray absorption at a sulfur L-shell absorption edge in an energy range of 130 to 280 eV or a sulfur X-ray absorption at a sulfur K-shell absorption edge in an energy range of 2300 to 3200 eV.

The present disclosure (6) relates to the method for estimating abrasion resistance according to any one of the present disclosures (1) to (5),
  wherein the high-intensity X-rays have a brilliance of $10^{10}$ (photons/s/mrad$^2$/mm$^2$/0.1% bw) or more.

The present disclosure (7) relates to the method for estimating abrasion resistance according to any one of the present disclosures (1) to (6), wherein the polymer composite material is a polymer composite material after cross-link degradation.

The present disclosure (8) relates to the method for estimating abrasion resistance according to any one of the present disclosures (1) to (7), wherein the polymer composite material is at least one selected from the group consisting of a material containing one or more diene-based polymers and a composite material in which one or more rubber materials are combined with one or more resins.

The present disclosure (9) relates to the method for estimating abrasion resistance according to any one of the present disclosures (1) to (8), wherein the sulfur compound is a sulfur-containing compound generated by cross-link degradation.

The present disclosure (10) relates to the method for estimating abrasion resistance according to any one of the present disclosures (1) to (9), wherein a method of measuring the X-ray absorption is performed by scanning transmission X-ray microscopy.

The invention claimed is:
1. A method for estimating abrasion resistance, the method comprising:
  irradiating a sulfur compound-containing polymer composite material with high intensity X-rays;
  measuring an X-ray absorption in a small region of the polymer composite material while varying an energy of the X-rays, whereby a dispersion state and a chemical state of the sulfur compound are analyzed; and quantifying an inhomogeneous state of cross-link degradation in the polymer composite material based on the dispersion state and the chemical state, wherein the quantifying the inhomogeneous state of cross-link degradation is performed by calculating a degree of inhomogeneity of cross-link degradation using the following (Relationship 1):

(Degree of inhomogeneity of cross-link degradation)=$SO_A/SO_M$     (Relationship 1)

where $SO_A$ represents a sulfur oxide content of a sulfur-aggregated portion in the polymer composite material, and $SO_M$ represents a sulfur oxide content of a matrix portion in the polymer composite material.

2. The method for estimating abrasion resistance according to claim 1, wherein an abrasion resistance of the polymer composite material increases as a value of $SO_A/SO_M$ approaches 1.0.

3. The method for estimating abrasion resistance according to claim 1, wherein a value of $SO_A/SO_M$ satisfies the relationship $SO_A/SO_M \leq 100.0$.

4. The method for estimating abrasion resistance according to claim 1, wherein the method includes measuring at least one of a sulfur X-ray absorption at a sulfur L-shell absorption edge in an energy range of 130 to 280 eV or a sulfur X-ray absorption at a sulfur K-shell absorption edge in an energy range of 2300 to 3200 eV.

5. The method for estimating abrasion resistance according to claim 1, wherein the high-intensity X-rays have a brilliance of $10^{10}$ (photons/s/mrad$^2$/mm$^2$/0.1% bw) or more.

* * * * *